(12) United States Patent
Granger

(10) Patent No.: US 7,818,042 B2
(45) Date of Patent: Oct. 19, 2010

(54) METHOD AND APPARATUS FOR UNIQUELY IDENTIFYING TISSUE PATHOLOGY

(75) Inventor: Edward M. Granger, Novato, CA (US)

(73) Assignees: Mastercolors LLC, Santa Barbara, CA (US); Ontario Beach Systems LLC, Novato, CA (US)

( * ) Notice: Subject to any disclaimer, the term of this patent is extended or adjusted under 35 U.S.C. 154(b) by 673 days.

(21) Appl. No.: 11/894,865

(22) Filed: Aug. 20, 2007

(65) Prior Publication Data

US 2009/0054756 A1 Feb. 26, 2009

(51) Int. Cl.
*A61B 5/05* (2006.01)
*G06K 9/00* (2006.01)

(52) U.S. Cl. .................... 600/407; 382/128; 600/410; 600/425

(58) Field of Classification Search .......... 600/407; 382/128
See application file for complete search history.

(56) References Cited

U.S. PATENT DOCUMENTS 5,410,250 A * 4/1995 Brown .................. 324/309
6,580,936 B2 * 6/2003 Muraki et al. ............. 600/410

\* cited by examiner

*Primary Examiner*—Eric F Winakur
*Assistant Examiner*—Michael T Rozanski
(74) *Attorney, Agent, or Firm*—Robert Schuler

(57) ABSTRACT

A medical diagnostic imaging system is employed to generate two or more diagnostic images with each image generated using a different imaging modality. The imaging system includes an imaging device for generating the diagnostic image information, an operator interface for controlling the operation of the imaging device, an imaging device control module that operates on the diagnostic image information generated by the imaging device and sends the processed image information to a display device. After first generating two or more test images that are used to identify target tissue and to derive functions that are later used during the diagnostic process to identify target tissue and to assign vector magnitudes to the identified target tissue, two or more diagnostic images are then generated and the color in each image is quantified. The images that have been color quantified are then run through a matrix operation which employs the earlier derived functions to identify potential target tissue and to assign vector magnitudes to the identified target tissue. The results of this matrix operation are then processed to arrive at a characteristic diagnostic result which is used to reach a diagnostic conclusion.

24 Claims, 7 Drawing Sheets

IMAGING SYSTEM 1

METHOD AND APPARATUS FOR UNIQUELY IDENTIFYING TISSUE PATHOLOGY

FIELD OF INVENTION

My invention relates generally to the area of medical imaging technology and specifically to applying color to images generated by medical imaging devices for the purpose of distinguishing pathological tissue from normal tissue in humans.

BACKGROUND OF THE INVENTION

A number of clinical imaging methodologies are available that generate grayscale images of the internal structure of the human body. Computer tomography (CT) is useful for imaging dense structures such as the skeletal system, positron emission tomography (PET) is used in conjunction with the injection of certain fluids to obtain functional information about human tumors, and magnetic resonance imaging (MRI) is used to image structures in the human body other than the skeletal structure. Each of these imaging methodologies or modalities is capable gathering three-dimensional information about the structure of the human body in multiple two dimensional slices. All of the different structures or tissue types in each of the two dimensional images are rendered in a shade of gray depending upon the absorption, reflection or nuclear spin characteristics of the different tissue types. These grayscale images are examined by a diagnostician in order to arrive at a diagnostic conclusion with respect to the location and type of pathological tissue or tumor that is present. Unfortunately, each imaging methodology has limitations. For instance, CT is most useful for imaging the skeletal structure, but not soft tissue, whereas MRI is most useful for imaging soft tissue, but may not provide the resolution or spatial detail that PET offers. To overcome this problem, it is typical to order a series of images generated by two or more of the available imaging methodologies or modalities and to place the images side-by-side and compare the results to arrive at a diagnosis. This process of examining multiple side-by-side images of the same portion of the human body generated by different imaging modalities places a large burden upon the diagnostician and, whether due to fatigue or the physiological limitation of a human's visual ability to discriminate between shades of gray (can only identify 16-32 shades), can lead to false diagnostic results. To solve this problem, diagnosticians have been led to superimpose the information contained in one grayscale image generated by one modality upon the information contained in another grayscale image generated by a second modality to create a single, composite grayscale image.

One method commonly used to register multiple grayscale images generated using different modalities is to place two or more spot markers, detectable by the imaging modalities being utilized, at locations within the human body that are to be imaged. The resultant images are then registered, one to the other, using these spot markers.

Another method for multimodal grayscale image registration is disclosed in U.S. Pat. No. 7,020,313 assigned to Mirada Solutions Limited. FIG. 8 along with the description starting in column 4, line 25 discloses a somewhat more complex method comprised of obtaining images of three modalities, namely an emission, a transmission and a structural image, enhancing the emission image, segmenting areas of the transmission image, creating a mask and applying the mask to the emission image, matching the masked emission image to the structural image and displaying the registered images.

While superimposing one grayscale image upon another grayscale image is an improvement over the side-by-side comparison technique, it is still prone to erroneous diagnosis as the merging of two or more grayscale images into a single, composite grayscale image does not necessarily enhance the visual contrast between tissue types. As a means to enhance the visual contrast between tissue types, color has been applied to grayscale images generated by different imaging modalities, such as CT, MRI and PET. Typically, enhancing the visual contrast between different tissues in this manner simplifies the job of the diagnostician and leads to a more accurate diagnostic result.

A number of methods have been employed to apply color to grayscale images. The simplest approach is to divide the grayscale into some number of shades of gray between black and white and then map a different color to each of the shades of gray. So for instance, if the gray scale is divided into 256 shades, from 0 to 255, and each color is assigned 256 shades, from 0 to 255, gray shade "0" could be assigned a red color value of "255" a green color value of "0" and a blue color value of "0" and so on with each of the other 255 gray scale shades.

Another method for color encoding a grayscale image is described in PCT publication no. WO 00/28472A1 with reference to FIG. 1 starting on page 6, line 18. FIG. 1 shows a logical flow diagram that describes a process for providing a black and white digital image including a bitmap color table and matrix of intensity values, copying the bitmap color table into memory to create a temporary bitmap color table, copying the original bitmap color table into a temporary bitmap color table to create a temporary palette array, replacing ranges of values on the temporary bitmap color table with assigned color values to create a color-modified palette array, overwriting the original bitmap color table with the color-modified palette array wile allowing the original matrix of intensity values to remain unmodified, and refreshing an image on a display device to generate a colorized image without pixel saturation. While such a color encoding method can be an aid to the diagnostic process by increasing the contrast relationships between proximate structure, a side-to-side comparison of color images generated using different modalities may still be necessary.

Another method for coloring grayscale images is disclosed in U.S. Pat. No. 7,145,336. In the summary section in column 2, starting on line 35 it is disclosed that MRI biophysical parameters of a region of interest are mapped as gray tone images and color masks are then applied to the gray tone images such that color is assigned to each of the biophysical parameters. As with the examination of multiple side-by-side grayscale images, the diagnostic process can be improved if the information contained in multiple, color images is merged into a single, composite color image. The method of this patent is primarily directed to obtaining and coloring a segmented three-dimensional rendering of a structural region and not to distinguishing any particular pathological tissue from normal tissue.

U.S. Pat. No. 5,410,250 discloses one method for producing a single color coded composite image from a plurality of multi-parameter magnetic resonance image sets. The summary section of this patent describes a method for obtaining a plurality of spatially aligned gray-tone magnetic resonance images at a plurality of predetermined pulse sequences to provide data concerning the spatial location and contrast discrimination of tissue voxels in the form of pixels having varied intensities; identifying selected regions of interest in each image representing tissues, fluids, etc.; plotting average signal intensities of pixels within each region of interest for each image according to each tissue voxel, assigning a different monochrome color to each of the images based on the signal intensities and on a desired final color rendition of a composite image formed of the plurality of images; then producing polychrome color images of the plurality of gray-tone images by combing the monochrome color with its respective image forming pixels of varying hue, saturation and intensity based on the intensity of the original gray-tone images and on the assigned monochrome colors.

U.S. Pat. No. 6,580,936 discloses another method of generating one color image from several, multi-channel MRI images. The summary section of this patent discloses that a number of MRI images are generated while varying conditions for a sample, such as a tissue sample, for which colors can be determined and for which MRI imaging is possible, then subjecting the information contain in each image to an independent component analysis to decompose the images into independent component images, selecting N points on the sample to create a training sample. This training sample is then used to generate as many transfer functions as the color components which output one color component for an arbitrary combination of independent component luminances and color components. In order to generate a color image, a number of MRI images are created while varying the conditions, and the data on the images are subjected to a second independent component analysis to generate some number of independent component images. Then, the second independent components are each calibrated to be equal to those of the first independent component, and the transfer functions obtained using the training samples are applied to the calibrated independent component images to obtain a color image.

Although the U.S. Pat. Nos. 6,580,936 and 5,410,250 patents disclose methods for combining information from multiple color images into a single composite color image, all of the information is generated using only a single modality and so any diagnostic conclusion based upon a reading of such a composite image is limited only to whatever pathological information can be identified by the single modality. Furthermore, both the -936 and -250 patents disclose a complicated method for "naturally" coloring the known, typical structures and tissue so that they can be easily recognized by a diagnostician according to these natural colors, no attention is paid to assigning a distinctive, characteristic color to pathological tissue so that it can be easily identified. Further, none of the prior art methods only identify pathological tissue with a distinctive color, rather all of the structure that is displayed in an image is colored which forces reliance on a diagnostician's skill in identifying an unnaturally occurring color among the naturally occurring colors in order to make a positive diagnosis.

Therefore, it would be advantageous if only pathological tissue in a composite image was displayed in a distinctive, characteristic color and all of the other structure displayed in the composite image is displayed in grey scale color.

INVENTION SUMMARY

In order to overcome the limitations of the prior art methods for identifying pathological tissue in composite images, this application discloses a method and apparatus for selectively assigning vector magnitudes to particular areas in diagnostic images, each image generated by a different modality, combining the vector magnitude information into a single composite image, and employing the resultant vector information to positively identify pathological tissue.

In one embodiment of my invention, a method is employed to identify target tissue in the human body by generating a plurality of images each image generated by a different imaging modality and each image containing color information associated with the target tissue; identifying at least one color value in each one of the plural images that represents the target tissue; assigning three different pre-selected vector magnitudes to the color in each one of the plural images that is associated with the target tissue and storing the location of the vector information in each of the plural images; calculating a sum for the first, second and third stored, pre-selected vector values to arrive at a set of total vector values and storing these values; employing the vector values in the set of total vector values to form a diagnostic mathematical relationship; and using the diagnostic mathematical relationship to positively identify the target tissue.

BRIEF DESCRIPTION OF THE DRAWINGS

FIG. 5b is a continuation of the flow diagram of FIG. 5a.

DETAILED DESCRIPTION OF THE INVENTION

Figure 1:
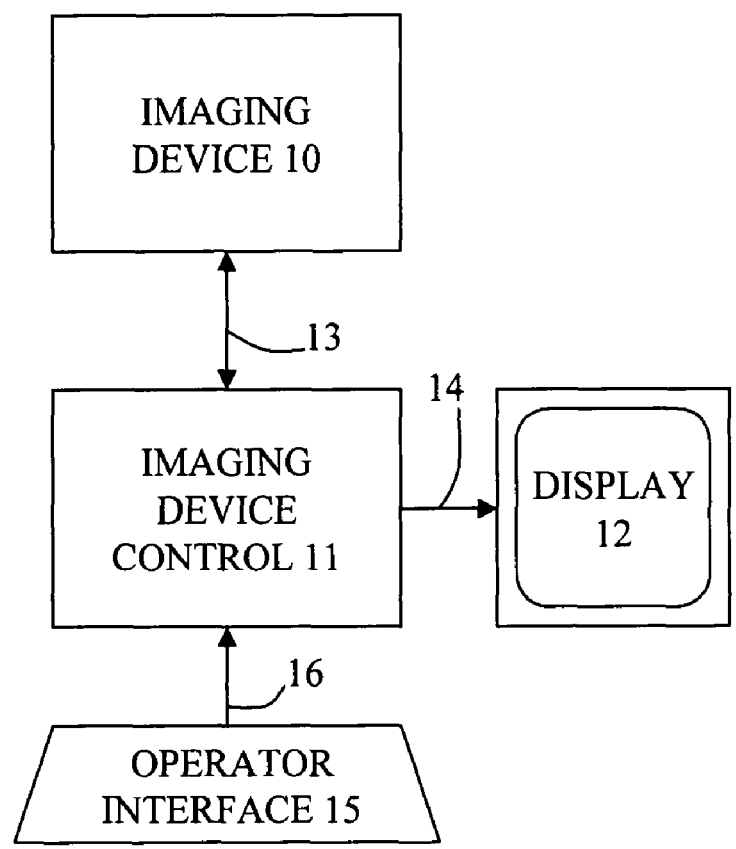
FIG. 1 is a system level functional block diagram showing a generic imaging device and the necessary control hardware and software.

The following description includes the preferred embodiment of my invention as well as alternative and optional embodiments. FIG. 1 shows a generic medical diagnostic imaging system 1 or simply imaging system that can be operated to conduct an imaging session which results in the detection of information about the internal structure of the human body and specifically to identify pathological or target tissue in a subject human body or simply target subject. As the result of conducting an imaging session using the imaging system 1, information in a digital format is gathered about the structure internal to a target subject or target subject. This digital information represents the magnitude of the absorption, reflection, nuclear spin or some other characteristic of the structures being imaged at a particular location in the target subject and detected by the imaging system as the result of the imaging process. In order for this imaging information to be useful to the diagnostic process, it is necessary to convert it into a form that can be easily used by a diagnostician. To this end, the imaging system converts the captured digital information to luminance information and assigns this luminance information to a pixel location in a two dimensional bitmap for display on a computer screen. Each pixel corresponds to a particular location in the target subject that is being imaged. Currently, a number of different modalities are being used to image the internal structure of the target subject, such as computer tomography (CT), positron emission tomography (PET) and magnetic resonance imaging (MRI) to name only three. Each of these modalities have diagnostic strengths and weaknesses and medical diagnosticians have, through experimentation, discovered that they can employ multiple imaging modalities to create images of a particular location in a target subject and compare the resultant images side-by-side to identify pathologies that would not otherwise be easily identified.

Imaging device 10 of FIG. 1 can include any one of a number of medical diagnostic imaging technologies some of which I have mentioned above. Alternatively, imaging device 10 can include two or more of the imaging modalities in that same imaging system such as PET/CT scanning systems. Regardless, it should be understood that my invention is not limited to only the modalities I have mentioned above. The imaging device 10 is controlled by an operator who enters commands using an operator interface 15 which commands are transmitted over an interface 16 to an imaging device control module 11 that generally operates to control the operation of the imaging device 10 to gather and store structural information about a particular location or particular locations within a target subject. Control signals are generated at the imaging device control module 11 for transmission to the imaging device 10 over the interface 13. The device control module 11 functionality can be implemented in a single computational device or in multiple computational devices. For instance, it may be convenient to integrate a second computational device into the imaging system that includes the software or firmware necessary to implement the method of my invention. It is not important whether the imaging system includes one or more computational device used to control its operation and any image information processing functionality needed to add color to the otherwise grey scale images.

Continuing to refer to FIG. 1 and in accordance with my invention, the operator can, subsequent to the generation and storing of at least one image, employ the imaging device control module 11 to strategically assign vector magnitude information only to those areas in each one of the grey scale images that is identified as pathological or target tissue. Further, the operator can employ the device control module 11 to combine the assigned vector magnitude information applied to each of the images in such a manner that it can be used to positively identify target tissue in the target subject, and then optionally cause an image to be displayed in image display 12 with only the target tissue being represented by a distinctive, characteristic color and the rest of the tissue being represented in a grey scale color or neutral color, for instance.

Figure 2:
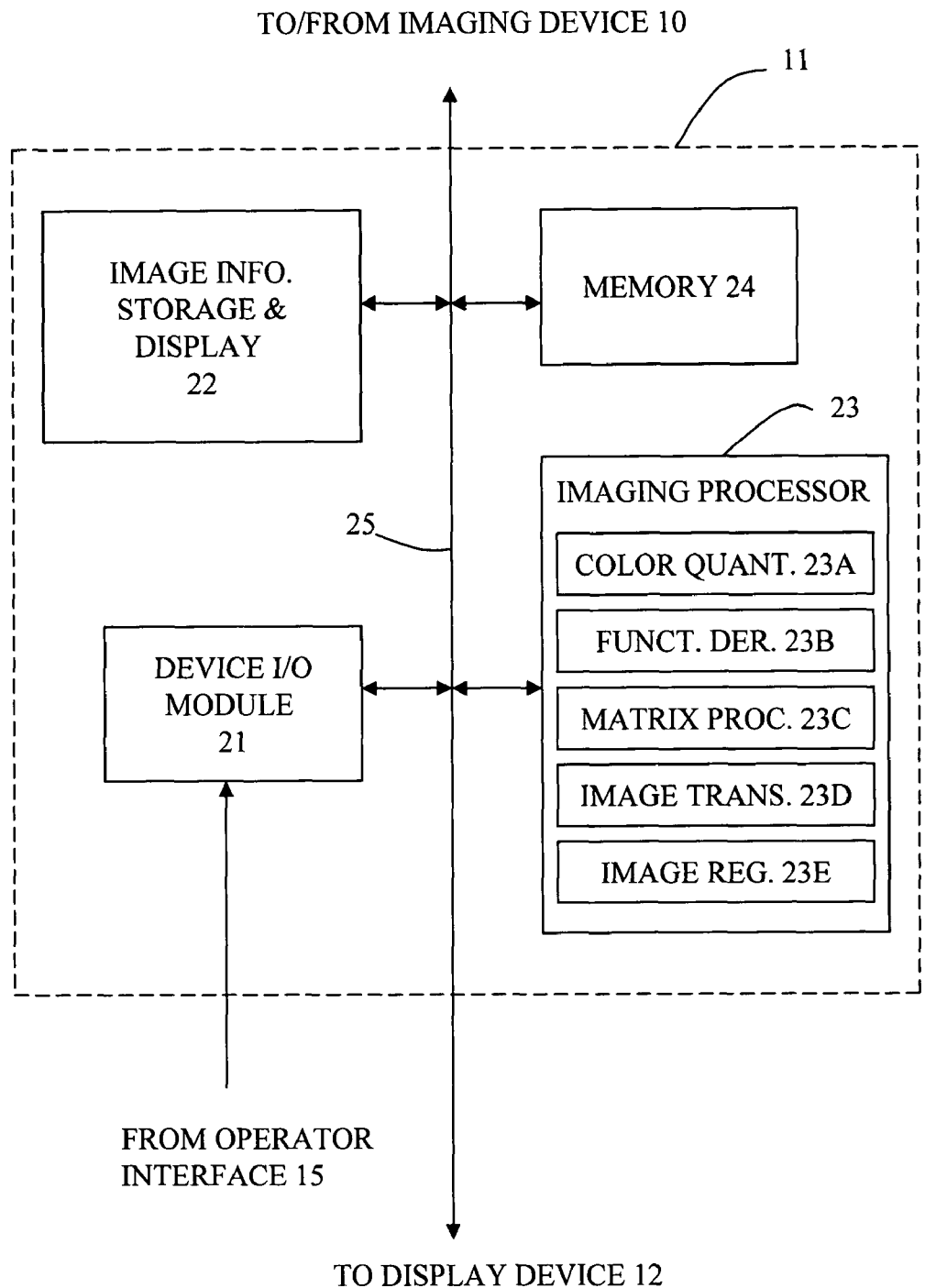
FIG. 2 is a functional block diagram showing the functional software modules necessary to implement to method of the invention.

FIG. 2 is a block diagram that shows the functional software or firmware modules included in the device control module 11 of FIG. 1 that are necessary to implement the method of my invention. An imaging system operator employs an input device, such as a keyboard and/or a mouse, to cause device input/output module 21 to initialize and control the progression of an imaging session and to control the operation of both an image information storage and display module 22 and an imaging processor 23. The image information storage and display module 22 operates to receive and store the results of an imaging session which in this case is some amount of digital information associated with at least one, but preferably more than one image of the internal structure of a target subject, and to display the results on display 12 as a grey scale image. An imaging processor 23, among other things, includes functionality needed to implement the method of my invention and includes a color quantification module 23a which operates to identify and store color information associated with at least one pixel in each one of the grey scale images that are generated by the imaging system as the result of the imaging process. Imaging processor 23 also includes a function derivation module 23b that operates to calculate the value of a function used to identify potentially pathological tissue in a grey scale image and to assign a vector magnitude to the identified, potentially pathological tissue, a matrix processing module 23c that functions to run, in the preferred embodiment of my invention, a three-by-three matrix which operates on each of the plurality of images generated as the result of the imaging process to identify target tissue and to assign pre-selected vector magnitudes to the grey scale images and which also functions to operate on these vector magnitudes to arrive at a characteristic diagnostic result which can be used to positively identify pathological or target tissue in a composite image. The imaging processor 23 also includes an image registration module 23e that functions to register the information contained in the plurality of images. The functionality performed by the color quantification module 23a is well known to those in the graphic arts field and is publicly available. One publicly available product that performs such color quantification functionality is sold by Master Colors® under the Color Composer™ name. The construction of the three-by-three matrix will be described later with reference to FIG. 5 and the vector magnitudes will be described later with reference to FIG. 4.

In order to implement the method of my invention, it is preliminarily necessary to establish how each, particular pathology of interest appears in the images generated by each of the imaging modalities that are used in the diagnostic process. This is accomplished by generating test images, using each of the different imaging modalities of interest, in areas of a target subject that are known to contain pathological tissue of a particular type. The resultant test images, known to contain pathological tissue, or target tissue, are then examined by a diagnostician and the location of the pathological tissue is noted. This can be accomplished by displaying a test image on image display 12 for instance and the diagnostician using the operator interface 15 to select the area in the test image that displays the pathological tissue of interest. Once the area has been selected, the diagnostician can initialize the color quantification module 23a which operates to determine the color value or range of color values exhibited by the area selected in the test image. The color value or range of color values, which in this case is a grey scale color value, in the test image generated by each one of the imaging modalities of interest that is associated with the known pathological tissue is stored in the image information storage and display module 12 as the known target tissue color value for later use. According to one embodiment of my invention, the range of color values is the set of all color values associated with the target tissue. Once the known target tissue color value has been quantified, it is then necessary to derive a number of diagnostic functions that will be used later during a diagnostic process to identify the known target tissue color value. The diagnostic function is composed of a target tissue identification portion and a vector magnitude assignment portion. The target tissue identification portion is employed by the function to identify areas in a diagnostic image that are potentially pathologic or target tissue and the vector magnitude portion is employed to assign a strategically, pre-selected vector magnitude to only the areas in a diagnostic image that are identified as being target tissue. In the preferred embodiment of my invention, the strategically, pre-selected vector magnitude can be any one of a primary color such as red, green or blue, for instance, that are used to create a palette of colors on a display device such as image display 12.

Specifically, with reference to the derivation of the diagnostic function described above, the known target tissue color value(s), stored as the result of the quantification process described in the previous paragraph, is used as input to the function derivation module 23b to derive and store an equation that becomes a first part of a function used to identify target tissue in an image. The function derivation module 23b utilizes some mathematical method, such as least squares fit, to derive this equation for the first part. The equation is used by the process of my invention to identify possible areas of target tissue by determining whether one pixel or a grouping of more than one pixel in a grey scale image satisfies the equation. An example of such an equation is shown below as Equation 1.

$$Ax + By + C = 0 \qquad \text{Eq. 1}$$

It should be understood, that although Equation 1 is a linear equation, it was selected for illustrative purposes only and this equation could be non-linear in nature as well. A second part of the function is composed of a vector magnitude assigned to the target tissue identified by the first part of the function which in the preferred embodiment of my invention as a hue intensity that is strategically, pre-selected by the diagnostician or some other person such that the color displayed in an image, such as the image in FIG. 3d, that is the composite of the diagnostic images represented by FIGS. 3a, 3b and 3c unambiguously and positively distinguishes the target tissue from all of the surrounding structure in the image. This color could be, for instance, a bright red hue. In the preferred embodiment of my invention, three functions are derived for each image, and each image is generated by a different imaging modality. So for instance, if two imaging modalities are used to generate one image each, then it becomes necessary to derive six functions and if three imaging modalities are used to generate one image each, then it becomes necessary to derive nine functions. For the purpose of this description, I will assume that three imaging modalities are used and that each modality is employed to generate at least one test image such as the images portrayed in FIG. 3a, FIG. 3b and FIG. 3c.

Figure 3A:
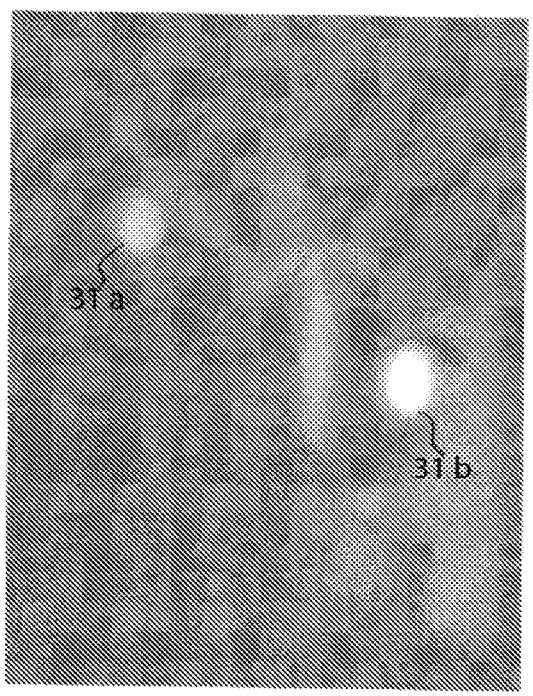
FIG. 3a is a simulated image generated by a first imaging modality showing structural details in grey scale colors.
Figure 3B:
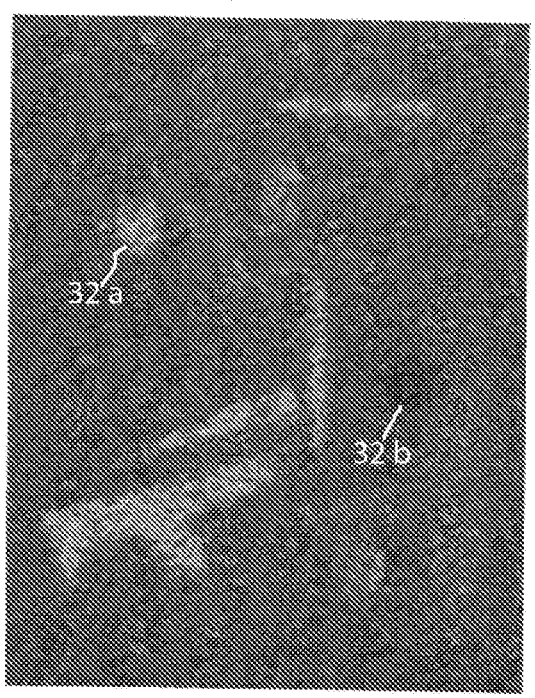
FIG. 3b is a simulated image generated by a second imaging modality showing structural details in grey scale colors.
Figure 3C:
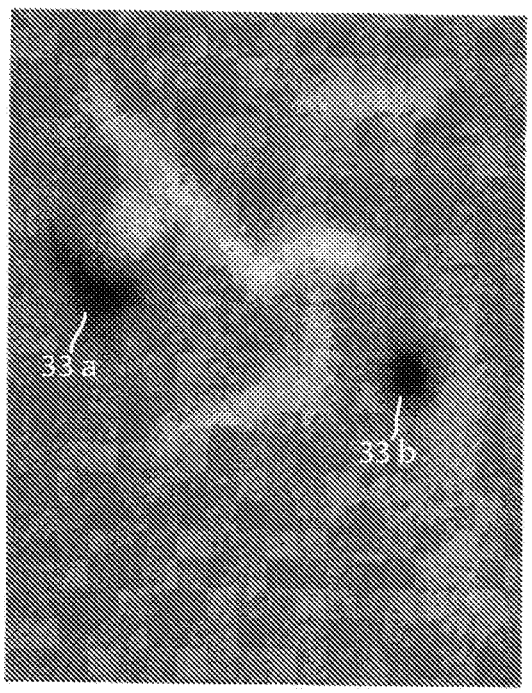
FIG. 3c is a simulated image generated by a third imaging modality showing structural details in grey scale colors.

Referring now to test images in FIGS. 3a, 3b and 3c in more detail. FIG. 3a represents the simulated image generated by a first imaging modality that exhibits moderate resolution and low contrast capabilities, FIG. 3b represents the simulated image generated by a second imaging modality that exhibits a good signal to noise ratio and image sharpness and FIG. 3c represents the simulated image generated by a third imaging modality that exhibits poor resolution. Each of these three simulated images display target subject structure that is displayed in color whose values fall within the grey scale, that is to say, all of the colors in each of the simulated images in FIGS. 3a, 3b and 3c correspond to color values that lie on the "Y" axis of the identification space illustrated in FIG. 4. For the purpose of this description, it should be assumed that the grey scale has eight bit resolution or that it contains 256 colors with zero being black and 255 being white. Also, for the purpose of this description, it is assumed that each of the images represented by FIGS. 3a, 3b and 3c contain pathological tissue or target tissue. Specifically, the area in FIG. 3a labeled 31b, the area in FIG. 3b labeled 32b and the area in FIG. 3c labeled 33b all represent areas of pathology. Now, as described previously, in order to implement my invention it is necessary to identify those areas in each image that are known to contain target tissue, to select these areas and then to quantify the grey scale color value in each of these selected areas. So, for instance, in the image of FIG. 3a it is known that the area labeled as 31b represents an area in the image displaying the target tissue and in the image of FIG. 3b it is known that the area labeled as 32b represents an area in the image displaying the target tissue and in the image of FIG. 3c it is known that the area labeled as 33b represents an area in the image displaying the target tissue. Knowing that each of these areas in each of the three images represents the target tissue, the diagnostician can then use the operators interface to select each of these three areas and, as described previously, employ the color quantification module 23a to quantify the color or range of colors that represent the target tissue in each of the images.

More generally with respect to FIGS. 3a, 3b and 3c, it should be understood that images generated during the diagnostic process may display pathological tissue and non-pathological tissue in the same color making it difficult to come to a diagnostic conclusion. Mistaking non-pathological tissue for pathological tissue in such cases is typically referred to as arriving at a false-positive diagnostic conclusion. For example, the areas in FIG. 1 labeled 31a and 31b are similar in appearance and a diagnostician might conclude that both areas represent pathological tissue, when in fact only the area labeled 31b, in this case, is pathological. My invention operates to eliminate such false positives from the diagnostic process.

Now, before it is possible to practice the method of my invention, it is necessary to assign a vector magnitude, which in the preferred embodiment of my invention is a hue value, to the second part of each of the previously mentioned nine functions. The hue value is selected for each of the functions such that when the hue value information that is assigned to each of the images is combined, the resultant composite diagnostic color clearly and unambiguously identifies the target tissue from all of the other structure in the image. Although experience with this hue value selection process is helpful when deriving the second part of each function, selecting the "best" hue value tends to be an iterative process.

Figure 4:
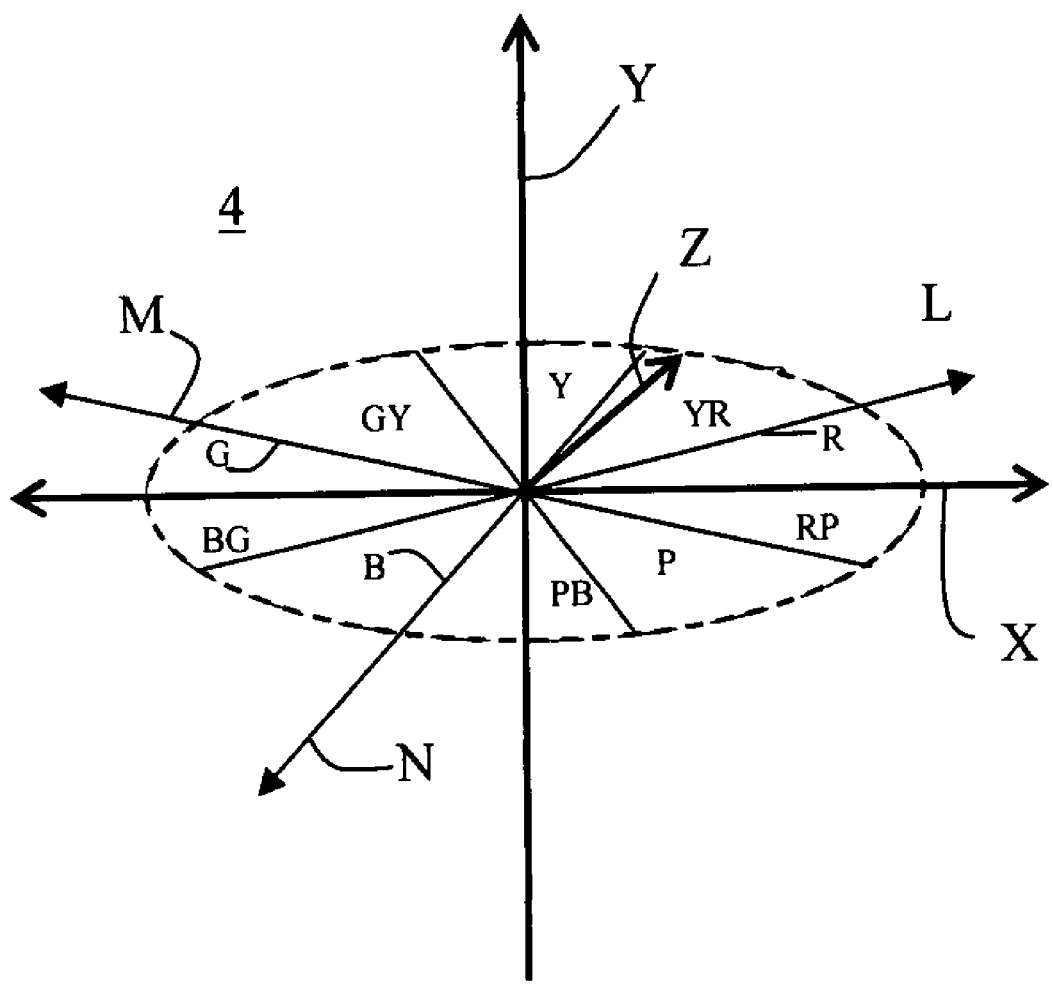
FIG. 4 is a diagram illustrating an identification space.

FIG. 4 illustrates an identification space 40 that I have constructed to implement the method of my invention. This identification space is a three dimensional characteristic vector space which characteristic in the preferred embodiment of my invention is one of three primary colors red, green and blue, but the vector space can be a function of other characteristics such as the detected imaging device signal strength per pixel in an image for instance. The identification space 40 is composed of three characteristic vectors L, M and N each of which originate at the axis Y which in this case, and as previously mentioned, represents all of the 256 grey scale colors with the black shades at the bottom of the Y axis and the white shades at the top of the Y axis. Although the L, M and N vectors are shown in FIG. 4 as originating from the mid point of the Y axis, or half way between the black and the white values, these vectors could originate at any point on this axis, although it is helpful computationally for all three of the vectors to originate from the same point on the Y axis. As illustrated by FIG. 4, and in accordance with the preferred embodiment of my invention, the L, M and N vectors correspond to particular color values of Red, Green and Blue respectively and that are assigned to those areas of an image that are identified as target tissue. Also shown in FIG. 4 are the axis X and the axis Z. The X axis represents the color intensity or chroma value of a particular hue and the Z axis rotates around the Y axis and represents all of the values of hue in the identification space.

As described previously, the second part of a diagnostic function operates to assign a particular vector magnitude to potential target tissue. In one embodiment, this vector magnitude is a particular value of hue, which value is selected from among all of the hue values in the identification space, but which in the preferred embodiment of my invention is one of the primary colors Red 5, Green 5 or Blue 5 with the "5" in each case indicating the hue value. In this case, each of three different functions operates on each of three diagnostic images, each diagnostic image being generated by a different imaging modality. In operation, and as the result of using these functions, the method of my invention automatically identifies only those areas in each diagnostic image that may represent target tissue and assigns a vector magnitude or value, which in this case is a hue value, to each of these areas. The vector magnitudes for each of the three diagnostic images, each image being generated by a different imaging modality, are summed together to arrive at a total vector value which in this case is equivalent to a particular color value. This operation is performed for each of the L, M and N vectors for a total of nine operations. More specifically, three functions are derived for each of the three images, each image generated by a different modality. Since each of the different modalities displays the same structure in a target subject in different grey scale color values, it is necessary to derive a different first portion of a function for each separate imaging modality. So, a grey scale color value of 240 as represented by area 31b in FIG. 3a is an indication that this area may represent the target tissue. A grey scale color value of 50 as represented by the corresponding area 32b in FIG. 3b is an indication that this area may represent the target tissue and a grey scale color value of 10 as represented by the corresponding area 33b in FIG. 3c is an indication that this area may represent the target tissue. Finally, three vectors L, M and N are necessary in order to drive all three primary colors in a typical display device, such as the display 12 in FIG. 1 that employs red, green and blue in various combinations to display the desired color in an image.

Table 1 below illustrates the structure of a three-by-three matrix used to operate on every location or pixel in each of three grey scale images, each grey scale image being generated by a different imaging modality, in order to generate total vector values that are employed to define a mathematical relationship, the value of which relationship can be used to identify a target tissue.

TABLE 1

A1 * Image 1 + A2 * Image 2 + A3 * Image 3 = L(t)
B1 * Image 1 + B2 * Image 2 + B3 * Image 3 = M(t)
C1 * Image 1 + C2 * Image 2 + C3 * Image 3 = N(t)

Each of the nine previously described functions are represented in TABLE 1 as A1, A2, A3, B1, B2, B3, C1, C2 and C3. As can be seen by examination of this TABLE, each of the nine functions operate on one of three grey scale images, Image 1, Image 2 and Image 3, each image being generated by a first a second and a third imaging modality respectively. Also as previously mentioned, each of the nine functions are derived specifically to operate on an image generated by a particular imaging modality to identify a color value in each grey scale image that represents a target tissue and to assign a pre-selected vector magnitude or value to at least one location in each of the grey scale images that corresponds to the target tissue. The results of the operations of the A, B and C sets of functions on each location or pixel in each of the Images 1, 2 and 3 are then each separately summed to arrive at a set of three total vector values L(t), M(t) and N(t) for each pixel location in each image. This pixel summation process will not return any meaningful results unless the three images generated by the three different imaging modalities are registered, one to the other, which after summed results in the creation of a composite image. As the result of generating images using different imaging modalities, color information associated with the internal structure of the target subject may be assigned to different pixel locations in the two dimensional bitmap. The object for registering the three images is to normalize the pixel locations for the same internal structures, so that when the vector magnitudes for each pixel or grouping of pixels in each of the three images are summed, the resultant total vector magnitude or value is indicative of the vector magnitudes assigned to the same structures in each image. Methods for accomplishing such image to image registration are well know to those in this field and so will not be described here in any detail.

The set of three total vector values L(t), M(t) and N(t) for each pixel are then used to form a resultant unit less mathematical relationship for each pixel location, which in this case is the ratio illustrated below in relation to Equation 2, which is used to positively identify a target tissue. I will refer to this ratio as the characteristic diagnostic result.

$$L:M:N \qquad \text{Eq. 2}$$

Although I have characterized the resultant diagnostic mathematical relationship as "unit less", in the preferred embodiment of my invention particular hue values are assigned to each of the matrix functions which result in some total hue value associated with each vector L, M and N. Adding the L, M, and N total hue values together for each pixel results in a particular diagnostic hue value that is an integer.

The three-by-three matrix described previously with reference to TABLE 1 can be used during the diagnostic process to identify possible target tissue and to assign vector magnitudes as described above. The matrix processor 23c described with reference to FIG. 2 is used to generate a pre-calculated diagnostic mathematical relationship or characteristic pre-calculated result which in this case is a ratio or so called "ground truth" against which a characteristic diagnostic result can be compared. If the characteristic diagnostic result is equivalent to a characteristic pre-calculated result associated with the target tissue or target pathology, a positive diagnostic result has been achieved.

Figure 3D:
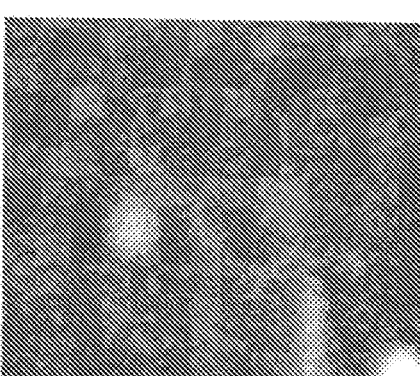
FIG. 3d is a composite image formed by the combination of the grey scale information in FIGS. 3a, 3b and 3c with pathologic tissue displayed in color.

Subsequent to the images being registered, the target tissue that is positively identified in the composite image, which in this case corresponds to the image in FIG. 3d, can be displayed in the image display 12 shown with reference to FIG. 1. Although the target tissue, which in this case is represented by the area labeled 32d, that is positively diagnosed can be displayed in the composite image as a particular diagnostic hue value, this hue value may or may not have enough color contrast with respect to the background color values to be easily observed by a diagnostician.

Figure 5A:
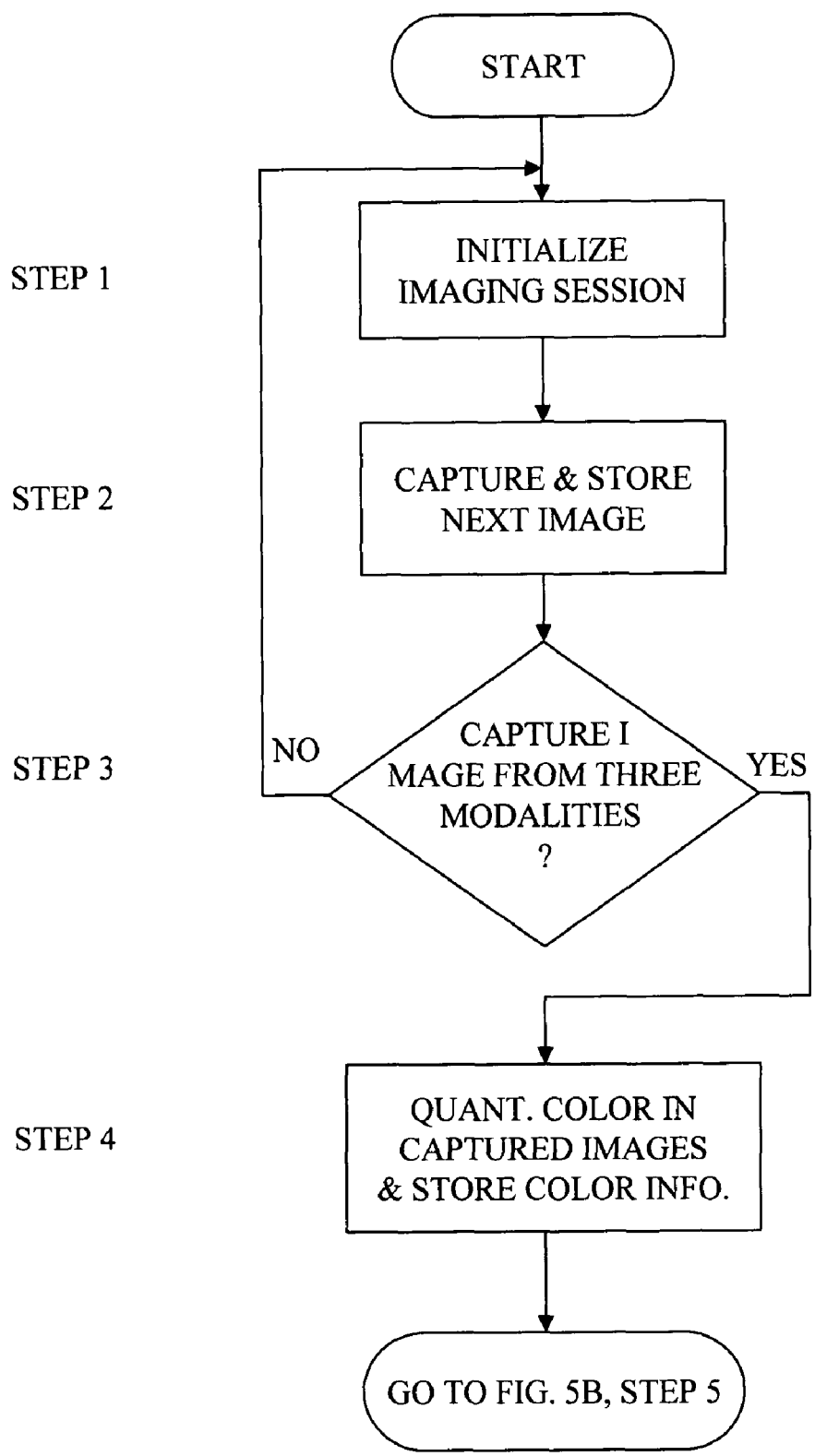
FIG. 5a is a logical flow diagram of the preferred embodiment of the invention.
Figure 5B:
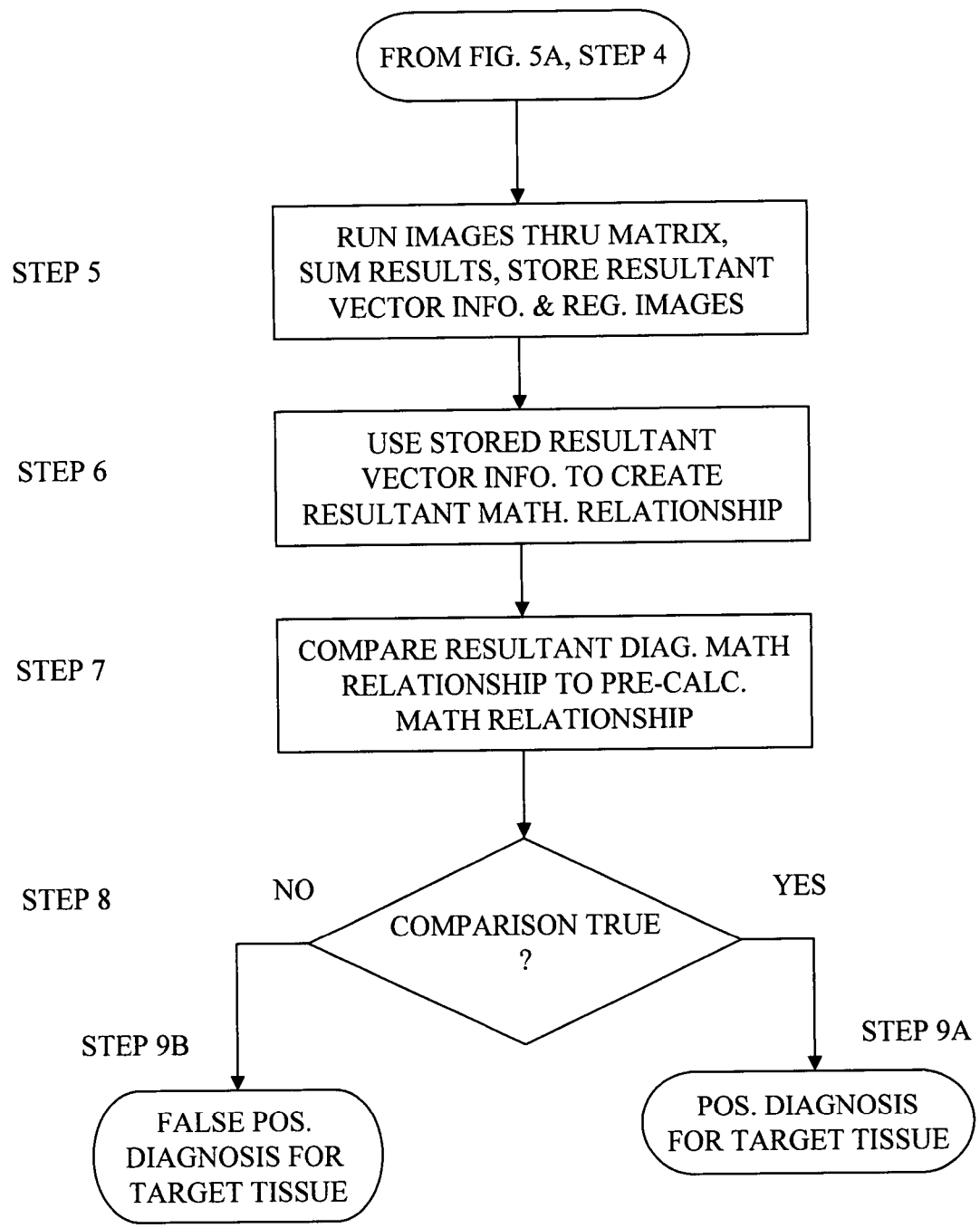

FIG. 5 is a logical flow diagram of the preferred embodiment of the method of my invention. Preferably, at least three imaging sessions are conducted and each of the at least three imaging sessions is conducted using a different imaging modality. Further, each of the at least three imaging sessions result in the generation of at least one grey scale diagnostic image which grey scale color information is then stored for later use. A first imaging session is started by an imaging system operator in step 1 using a first imaging modality. In step 2, the results of the first imaging session are captured by the imaging information storage and display module 22 of FIG. 2. The result of the first imaging session is information in a digital format about the internal structure of a target human body or target subject. This digital information represents the magnitude of the absorption, reflection, nuclear spin or some other characteristic of the structures being imaged at a particular location in the target subject detected by the imaging system as the result of the imaging process. In order for this imaging information to be useful to the diagnostic process, it is necessary to convert it into a form that can be easily used. To this end, the imaging system converts the digital information representing the magnitude of reflection, absorption or nuclear spin to luminance information and assigns this luminance information to a pixel location in a two dimensional bitmap for display on a computer screen. In step 3, the operator determines whether at least one diagnostic image generated by each of the three imaging modalities has been captured, and if not the operator proceeds to initialize a second imaging session using a second imaging modality. Image information is again captured in step 2 as before and in step 3 the operator again checks to determine whether at least one diagnostic image has been captured using all three of the imaging modalities. The process loops from step 1 to step 3 until the at least three imaging modalities have been employed to capture image information about a subject target. If in step 3, the operator determines that image information is stored from at least three imaging modalities, then the process proceeds to step 4 where the color quantification module 23a of FIG. 2 is used to analyze the luminance information associated with each pixel location in each of the diagnostic images captured in step 2 of this process and assign grey scale color information to each of these pixels. This per pixel grey scale color information is stored in display module 22 for later use. In step 5, all of the pixel information in each of the at least three captured diagnostic images is run through the three-by-three matrix as described earlier with reference to Table 1. The result of this operation in the preferred embodiment of my invention is a set of total vector values for each pixel in each diagnostic image. The three diagnostic images are then registered as previously described and the registered diagnostic image information contained in the at least three images is then combined into a composite diagnostic image which contains what I refer to as total composite vector information and stored in the image information storage module 22.

Continuing to refer to FIG. 5, in step 6 the stored composite vector information is used by the matrix processing module 23c to calculate a characteristic diagnostic result which can also be thought of as a characteristic diagnostic vector relationship or value which in the preferred embodiment of my invention is a ratio relationship and in step 7, the matrix processing module is employed to compare the characteristic diagnostic result to a characteristic pre-calculated result for the target tissue. If in step 8, the comparison in step 7 is true, that is there is a match between the values of the pre-calculated and diagnostic results, then in step 9a a signal is generated by the matrix processing module that is indicative of a positive diagnostic result and can be sent to the display module for display on the display device 12. If on the other hand, the comparison in step 7 is not true, i.e., there is no match, then a false positive result is indicated.

Figure 6:
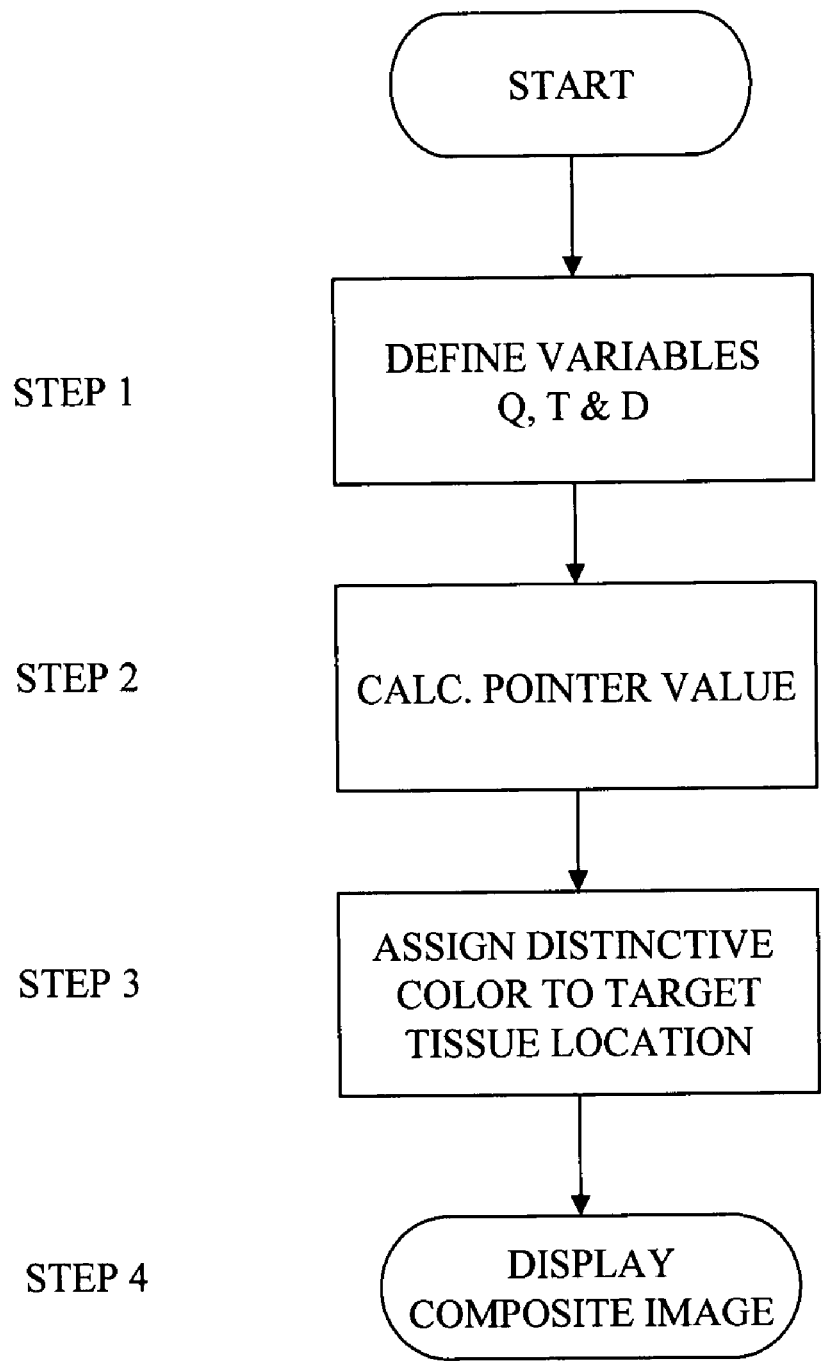
FIG. 6 is a logical flow diagram of an optional method of the invention.

I will refer now to FIG. 6, which is a logical flow diagram illustrating an optional process that can be used to transform the resultant composite diagnostic color to a distinctive hue value that is easily distinguished from the background color in the composite color image. In order to display the target tissue in the composite image as a distinctive and easily observed color on an image display, it may be necessary to transform the resultant composite diagnostic color from a hue value that may not be easily distinguished from the image background color, to a hue value that is easily distinguished by the human eye such as red, green, blue, purple, or cyan, for instance. In step 1, this transformation process is initiated by defining three variables Q, T and D in terms of the three characteristic vectors L, M and N as shown below in Equations 3, 4 and 5.

$$Q = L + M + N \qquad \text{Eq. 3}$$

$$T = L - M \qquad \text{Eq. 4}$$

$$D = 0.5(L+M) - N \qquad \text{Eq. 5}$$

In step 2, the resultant Q, T and D values are then inserted into Equation 6 and Equation 7 below which are used to calculate a "pointer" to a location in a two dimensional color space.

$$t = T/Q \qquad \text{Eq. 6}$$

$$d = D/Q \qquad \text{Eq. 7}$$

The values of the variables "t" and "d" can be considered as coordinates which point to a location in the two dimensional color space such as the well known CIExy color space. Each location pointed to in the two dimensional color space is a distinctive color or hue that can be easily perceived/distinguished by the human eye. In step 3, the distinctive color is assigned to the locations in the composite image that are positively diagnosed as target tissue and in step 4 the composite image is displayed.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. In a medical diagnostic imaging system, a method for positively identifying target tissue in a target subject comprising:

generating at least two test images of the same location in the target subject that contains known target tissue, each one of the at least two images are generated using a different imaging modality and storing the at least two test images;

identifying a color value in each of the at least two stored test images that corresponds to the known target tissue and storing the color value as the known target tissue color value;

selecting a vector magnitude for the known target tissue color value identified in each of the at least two test images;

using the stored known target tissue color values and the selected vector magnitudes to derive a plurality of diagnostic functions;

generating at least two diagnostic images of the same location in the target subject, each of the at least two diagnostic images are generated using a different imaging modality and storing the at least two diagnostic images;

utilizing the plurality of diagnostic functions to assign at least first, second and third pre-selected vector magnitudes to locations in each of the at least two stored diagnostic images if any of the stored diagnostic images include a color value that is the same as the stored known target tissue color value and storing the location of the assigned first, second and third pre-selected vector magnitudes in each of the at least two diagnostic images;

registering the at least two stored diagnostic images;

summing the at least first, second and third stored, pre-selected vector magnitudes that are assigned to the same location in each of the at least two stored diagnostic images to arrive at corresponding first, second and third total vector values for each location, and storing the values as a set of total vector values;

employing the set of total vector values to form a value of a diagnostic mathematical relationship; and using the value of the diagnostic mathematical relationship to positively identify the target tissue.

2. The method of claim 1 wherein using the value of the diagnostic mathematical relationship to positively identify the target tissue is comprised of:

comparing the value of the diagnostic mathematical relationship to a pre-determine mathematical relationship; and positively identifying the target tissue if the value of the diagnostic mathematical relationship and the pre-determined mathematical relationship are the same.

3. The method of claim 2 further comprising an image translation module that uses the characteristic diagnostic result to calculate a pointer value that identifies a location in a color space corresponding to a particular color if the target tissue is identified; and assigning the particular color pointed to in the color space to the target tissue in a composite image of the at least two diagnostic images.

4. The method of claim 1 further comprising employing the value of the diagnostic mathematical relationship to calculate a pointer value that identifies a location in a color space corresponding to a particular color if the target tissue is identified; and assigning the particular color pointed to in the color space to the target tissue in a composite image of the at least two diagnostic images.

5. The method of claim 4 wherein the color space is one of a two dimensional and a three dimensional color space.

6. The method of claim 1 wherein the target tissue is pathological tissue.

7. The method of claim 1 wherein the target subject is a human body.

8. The method of claim 1 in which the identified color value is a range of color values.

9. The method of claim 1 wherein all of the at least two diagnostic images are one of a two dimensional image and a three dimensional image.

10. The method of claim 1 wherein the first, second and third pre-selected vector magnitudes are different hue values.

11. The method of claim 1 wherein the diagnostic mathematical relationship is a ratio relationship between the first, second and third total vector values.

12. The method of claim 1 wherein the different modalities used to generate each one of the two or more diagnostic images are selected from the group consisting of an MRI, a CT scan and an x-ray.

13. A multi-modality medical diagnostic imaging system comprising:

an imaging device;

an imaging device operator interface;

an image display; and an imaging device control apparatus, the imaging device control apparatus comprising:

a memory;

an image information storage and display module;

a color quantification module;

a function derivation module;

a device I/O module;

an image registration module; and a matrix processing module that employs a plurality of functions to identify target tissue in a plurality of diagnostic images each generated by a different imaging modality and to assign vector magnitudes to the identified target tissue and which processing module operates on the assigned vector magnitudes to arrive at a characteristic diagnostic result.

14. In a medical diagnostic imaging system, a method for positively identifying a target tissue in a target subject comprising:

generating at least two diagnostic images of the same location in a target subject, each of the at least two images are generated using a different imaging modality and storing the at least two diagnostic images;

utilizing a plurality of diagnostic functions to assign at least a first, a second and a third pre-selected vector magnitude to a location in each of the at least two stored diagnostic images if the location contains a color value that is the same as a known target tissue color value and storing the location of the assigned, pre-selected vector magnitudes in each of the at least two diagnostic images;

compiling a composite diagnostic image from the two stored diagnostic images with each location in the composite diagnostic image containing a first, a second and a third total vector value;

utilizing the first, second and third total vector values associated with each location in the composite diagnostic image to form a characteristic diagnostic result; and positively identifying the target tissue by comparing the characteristic diagnostic result to be the same as a characteristic pre-calculated result.

15. The method of claim 14 wherein using the characteristic diagnostic result to positively identify the target tissue is comprised of:

comparing the value of the characteristic diagnostic result to a pre-calculated diagnostic result; and positively identifying the target tissue if the value of the characteristic diagnostic result and the characteristic pre-calculated diagnostic are the same.

16. The method of claim 14 further comprising employing the value of the characteristic diagnostic result to calculate a pointer value that identifies a location in a color space corresponding to a particular color if the target tissue is identified; and assigning the particular color pointed to in the color space to the target tissue in a composite image of the at least two diagnostic images.

17. The method of claim 16 wherein the color space is one of a two dimensional and a three dimensional color space.

18. The method of claim 14 wherein the target tissue is pathological tissue.

19. The method of claim 14 wherein the target subject is a human body.

20. The method of claim 14 in which the identified color value is a range of color values.

21. The method of claim 14 wherein all of the at least two diagnostic images are one of a two dimensional image and a three dimensional image.

22. The method of claim 14 wherein the first, second and third pre-selected vector magnitudes are different hue values.

23. The method of claim 14 wherein the characteristic diagnostic result is a ratio relationship between the first, second and third total vector values.

24. The method of claim 14 wherein the different modalities used to generate each one of the two or more diagnostic images are selected from the group consisting of an MRI, a CT scan and an x-ray.

* * * * *